United States Patent [19]

Schank

[11] 3,878,168

[45] Apr. 15, 1975

[54] NOVEL SILICONE ELASTOMERS

[75] Inventor: Richard L. Schank, Webster, N.Y.

[73] Assignee: Xerox Corporation, Stamford, Conn.

[22] Filed: Nov. 30, 1973

[21] Appl. No.: 420,751

[52] U.S. Cl.... 260/46.5 E; 260/46.5 G; 260/77.5 R; 260/825

[51] Int. Cl. .............................................. C08f 11/04

[58] Field of Search ..... 260/46.5 E, 46.5 G, 77.5 R, 260/825

[56] References Cited
UNITED STATES PATENTS

| | | | |
|---|---|---|---|
| 3,008,922 | 11/1961 | Lisanke | 260/46.5 E |
| 3,278,485 | 10/1966 | Morgan et al. | 260/46.5 E |
| 3,772,351 | 11/1973 | Krahnke | 260/46.5 E |

Primary Examiner—Melvyn I. Marquis
Attorney, Agent, or Firm—James J. Ralabate; James P. O'Sullivan; Donald M. MacKay

[57] ABSTRACT

Novel elastomers are provided of the formula:

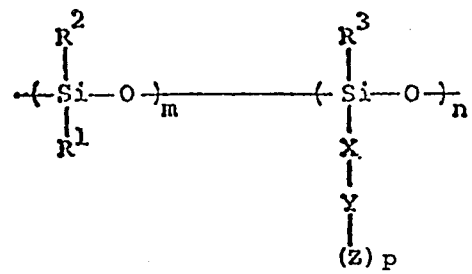

wherein $R_1$, $R_2$ and $R_3$ are independently selected from aryl and alkyl of 1 to 10 carbon atoms; X is a polymethylene chain of from 2 to 10 carbon atoms; Y is a group selected from ureido, silylureido, amido, silyamino, thioureido, silylthioureido, urethane alkylideneamino, isocyanoureido, halosilylamino and sulfonamido; Z is a hydrocarbon of from 1 to 50 carbon atoms selected from alkyl, alkaryl, aryl, aralkyl which hydrocarbon can be substituted with one or more groups selected from hydroxy, nitro, halo, sulfonamido and carboxyl; $m$ and $n$ are integers wherein the ratio of $m{:}n$ is between 20:1 and 1000:1, and $p$ is an integer from 1 to 3.

15 Claims, No Drawings

NOVEL SILICONE ELASTOMERS

BACKGROUND OF THE INVENTION

Silicone elastomers, commonly referred to as silicone rubber, have many desirable properties. One of their most remarkable properties is their resistance to dry heat. In addition, silicone rubber retains its flexibility down to unusually low temperatures. Whereas natural rubber has a glass temperature of −72°C and butyl rubber one of −70°C, the glass temperature of dimethylsiloxane rubber is −123°C. Further, silicone rubber is completely resistant to the action of oxygen and ozone on natural aging. Thus, silicone rubber is one of the most weather-resistant elastomers. In addition, silicone rubber has excellent electrical properties, which are better than natural rubber at elevated temperatures, and has good chemical properties being resistant to water, mineral oils and aliphatic motor and machinery oils.

One disadvantage of the silicone elastomers which are crosslinked is that they are not suitable for solvent casting or material recovery due to their insolubility. One approach to this material handling problem has been the provision of silicone-containing block copolymers which derive their rubbery behavior from imcompatability and phase segregation of the various block components. While known organic/silicone block-copolymers are soluble in common hydrocarbon solvents, and also have excellent elastomeric properties, they can only be made by complex and costly methods. Thus, the provision of a new class of silicone elastomers possessing many desirable properties of both the crosslinked and the block-copolymer elastomers, but yet more easily and inexpensively prepared would be desirable.

BRIEF DESCRIPTION OF THE INVENTION

It has now been discovered that silicone elastomers which have the solubility of silicone/organic block-copolymers and many of the desirable elastomeric properties of both crosslinked and block-copolymer silicone rubbers can be prepared inexpensively by well known reactions. More specifically it has now been discovered that silicone gums containing a minor but effective amount of reactive pendant groups can be reacted with monofunctional compounds to cap the pendant groups and surprisingly provide elastomeric properties, although there is no chemical crosslinking through said pendant groups. In addition, these novel materials have nearly the same properties as silicone rubbers which are crosslinked through reactive pendant groups. Because the novel elastomeric compositions of the invention are not crosslinked through the reactive pendant groups, they can be dissolved in a hydrocarbon or other solvent and cast into a new shape. This property permits the use of scrap materials and other rejected components, which had to be previously discarded, because once crosslinked they could not be reconverted to their gummy uncured state. Thus the silicone elastomers of the invention have an advantage not possessed by the crosslinked silicone elastomers offered heretofore.

The novel silicone elastomers of the invention can be represented by the formula:

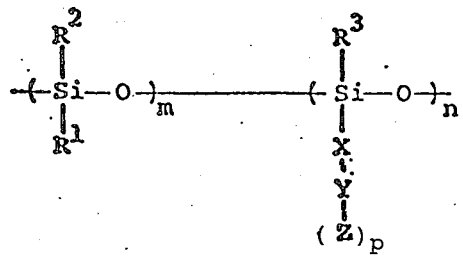

wherein $R^1$, $R^2$ and $R^3$ are independently selected from phenyl, and alkyl of 1 to 10 carbon atoms; X is a polymethylene chain of from 2 to 10 carbon atoms; Y is a group selected from ureido, silylureido, amido, silylamino, thioureido, silylthioureido, urethano, alkylideneamino, isocyanoureido, halosilylamino and sulfonamido; Z is a hydrocarbon of from 1 to 50 carbon atoms selected from alkyl, alkaryl, aryl, aralkyl which hydrocarbon can be substituted with one or more groups selected from hydroxy, nitro, halo, sulfonamido and carboxyl; $m$ and $n$ are integers wherein the ratio of m:n is between 20:1 and 1000:1, and $p$ is an integer of from 1 to 3.

The term "elastomer" as used herein is used in its customary sense to mean that the polymer has the general properties of natural or synthetic rubber and that they stretch under tension, retract and recover their original dimensions. Further, as is conventional with silicone elastomers, the number of repeating units as well as the range between the high and the low can be quite large. Thus the integer $m$ may be less than several ten thousand and greater than several hundred thousand. Likewise, the integer $n$ may vary considerably but will depend upon the properties desired and the size of the integer $m$. While the ratio of m:n will generally be between 20:1 and 1000:1, the preferred ratio is between 50:1 and 200:1.

The preferred elastomers are the type wherein the R groups are methyl. The R groups need not be the same, however, and can be independently selected from aryl and alkyl of from 1 to 10 carbon atoms, such as methyl, ethyl, propyl, butyl, hexyl, heptyl, octyl, phenyl, tolyl, xylyl and the like. The polymethylene chain represented by the letter "X" can be from 2 to 10 carbon atoms but is preferably 3 to 6 carbon atoms. The number of carbons which the hydrocarbon group Z contains will depend on the type selected. When the hydrocarbon is an alkyl, it can have as few as 1 carbon atom, rarely more than 20 and generally not more than about 50. Likewise, the aryl can have as few as 6 and as many as about 50 carbon atoms, while the alkaryl and aralkyl can have from 7 to 50 carbon atoms. The halo moiety can be chloro, bromo, fluoro, or iodo.

The starting materials or reactants for the novel elastomers of the invention are known materials and can be prepared by well known reactions. For example, the method for preparing the aminoorganopolysiloxane is disclosed in U.S. Pat. No. 3,449,289. The reaction of these siloxanes with the Y-Z moiety occurs by simple hydrogen replacement reactions. Convenient reaction conditions include a temperature range of between about 25°C and the reflux temperature of the solvent in which the reaction is conducted, for a period of between about 1 and 24 hours. The conventional solvents can be employed, it only being necessary that both reactants are at least partly soluble in said solvent. Typical solvents include benzene, toluene, xylene, dioxane, and tetrahydrofuran. If desired, a catalyst may be employed. Typical catalysts are the amines such as pyridine and trimethylamine. Other reagents may be employed such as hydrogen halide acceptors to include the aforementioned amines.

The novel elastomers of the invention can be employed as potting compounds, electrical insulators, mechanical shock absorbers, decorative items and toys and in other conventional applications for which silicone elastomers have been previously employed.

The following examples will serve to illustrate the invention and preferred embodiments thereof. All parts and percentages in said examples and elsewhere in the specification and claims are by weight unless otherwise indicated.

EXAMPLE I

The preparation of:

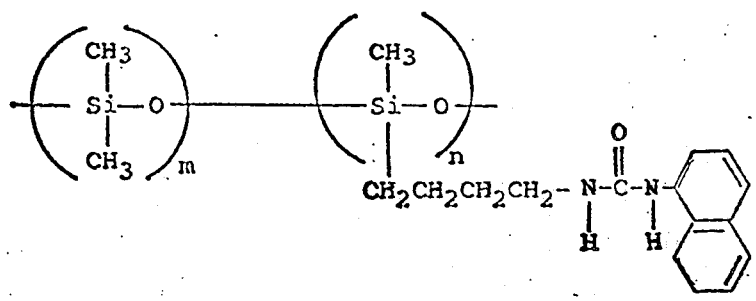

To a 250 ml. three necked flask equipped with a magnetic stirrer, thermometer, water condenser, drying tube and heating mantle was added 0.4 grams of 1-napthyl isocyanate and 100.0 grams of a 10 weight percent solution of poly (dimethyl siloxane) silicane gum in benzene (Union Carbide Corporation Y-8053) which gum has 1.5 weight percent of aminobutylmethylsiloxane pendant sites and a molecular weight from 200,000 to 500,000. The mixture was heated and agitated at a temperature between 45°–50°C for approximately 4 hours and then allowed to cool to room temperature. A small portion of this solution was removed from the flask and spread on an aluminum plate. The coating was allowed to dry at room temperature until the film was dry to the touch, exhibiting elastomer characteristics similar to a crosslinked structure. It was attempted to react a second portion of the solution with a polyfunctional isocyanate (polymethyl polyphenyl isocyanate manufactured by New Haven Chemical Corporation). A stoichiometric excess of 2 to 3 times of isocyanate was employed and the mixture was allowed to remain at room temperature for several hours. The failure of a gel to form indicated that no reaction occurred between the polyisocyanate and the silicone gum since there were apparently no free amino groups remaining in the silicone gum. The absence of unreacted amino groups indicates that the monofunctional 1-naphthyl isocyanate capped the pendant amino groups of the siloxane so that crosslinking could not occur through those amino groups. When, however, the silicone gum (Y-8053) was reacted with the polyfunctional isocyanate (polymethylene polyphenyl isocyanate) a gel did form which was insoluble in benzene indicating that crosslinking did occur between pendant amino groups.

EXAMPLE II

The preparation of:

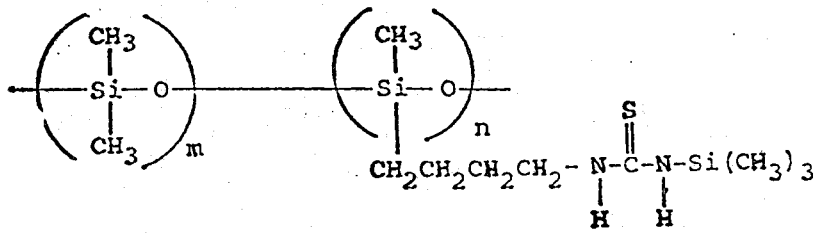

In accordance with the general procedure of Example I, the silicone of Example I was reacted with trimethylisothiocyanato silane.

EXAMPLE III

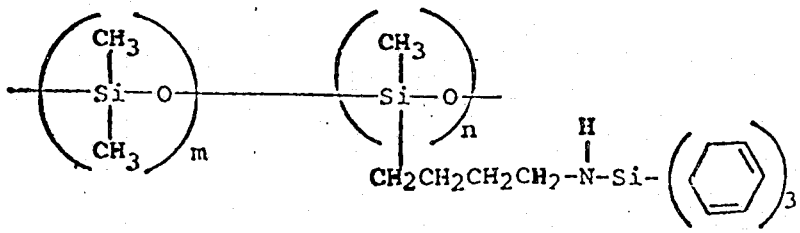

In accordance with the general procedure of Example I, the silicone gum of Example I was reacted with triphenyl chlorosilane. A sample of this elastomer approximately 100 microns thick was placed between two stainless steel discs having a diameter of 2½ cm. in a Weissenberg Rheogoniometer Model R18. The bottom disc was mounted to an oscillating shaft and the top plate was connected to a torsion bar. The sample was oscillated for approximately 45 minutes at a displacement of 600 to 700 microns from the point of rest, at a frequency of between 0.038 and 3.8 cycles per second. A control was also run with a crosslinked elastomer prepared from the silicone gum of Example I and toluene 2,4-diisocyanate. The modulus or resistance to stress was found to be nearly the same for both rubbers.

EXAMPLE IV

The preparation of:

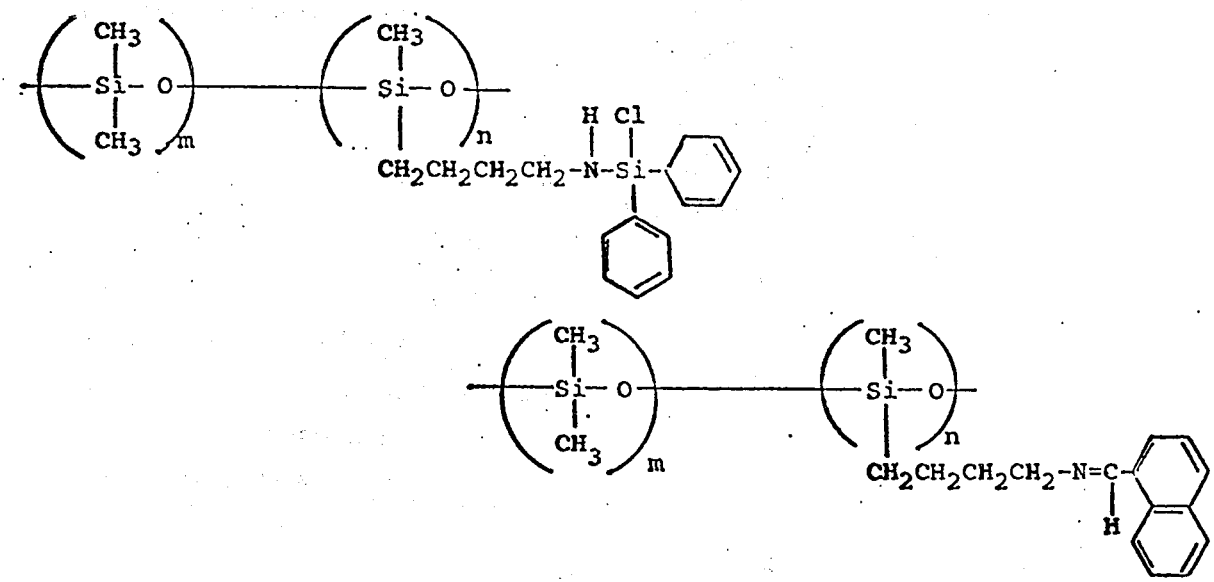

In accordance with the general procedure of Example I, a silicone gum of Example I was reacted with diphenyl dichlorosilane.

EXAMPLE V

The preparation of:

In accordance with the general procedure of Example I, the silicone gum of Example I was reacted with trimethylisocyanatosilane.

EXAMPLE VI

The preparation of:

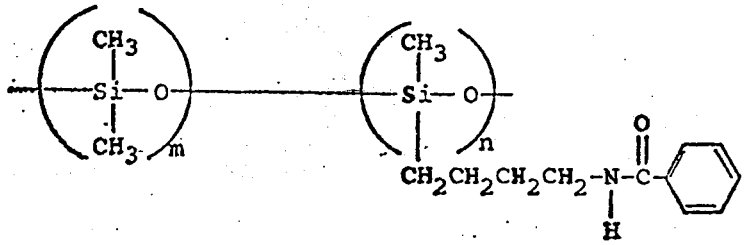

In accordance with the general procedure of Example I, the silicone gum of Example I was reacted with benzoylchloride in the presence of a stoichiometric amount of pyridine.

EXAMPLE VII

The preparation of:

In accordance with the general procedure of Example I, the silicone gum of Example I was reacted with 1-naphthylaldehyde.

EXAMPLE VIII

The preparation of:

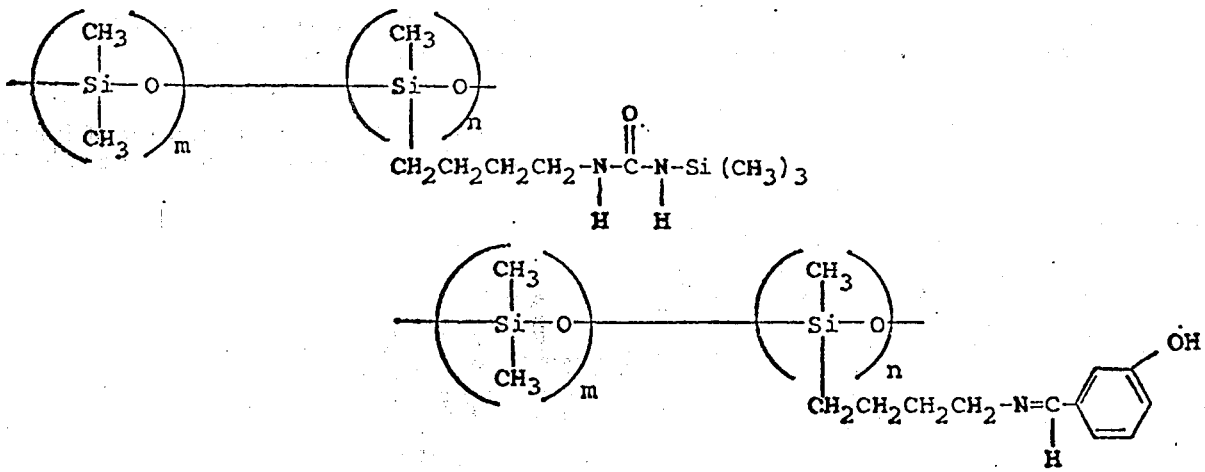

In accordance with the general procedure of Example I, the silicone gum of Example I was reacted with meta-hydroxybenzaldehyde.

EXAMPLE IX

The preparation of:

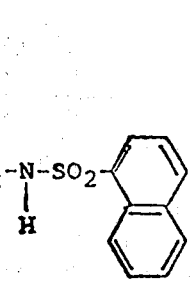

In accordance with the general procedure of Example I, the silicone gum of Example I was reacted with 1-naphthyl sulfonic acid chloride in the presence of a stoichiometric amount of pyridine.

EXAMPLE X

The preparation of:

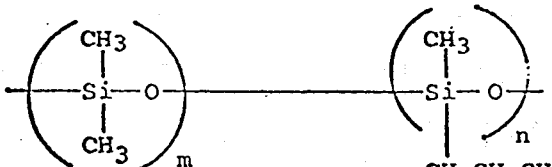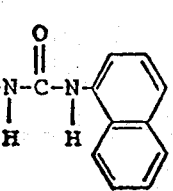

In accordance with the general procedure of Example I, a silicone polymer containing a minor amount of isocyanatobutyl methylsiloxane pendant groups was reacted with 1-naphthyl amine.

EXAMPLE XI

The preparation of:

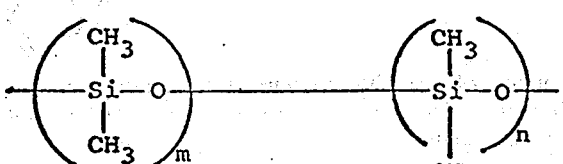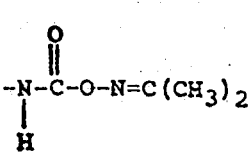

In accordance with the general procedure of Example I, the silicone gum of Example X was reacted with acetone oxime.

EXAMPLE XII

The preparation of:

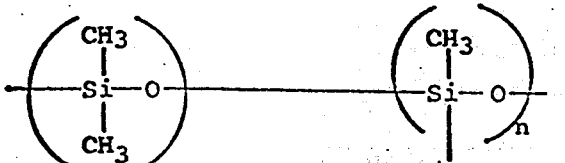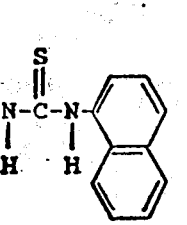

In accordance with the general procedure of Example I, a silicone gum containing a minor amount of isothiocyanatobutylsiloxane pendant groups was reacted with 1-naphthylamine.

EXAMPLE XIII

In accordance with the general procedure of Example I, Examples I–IX are repeated substituting aminoethyl-methylsiloxane as the reactive pendant groups of the silicone gum.

EXAMPLE XIV

In accordance with the general procedure of Example I, Examples I–IX are repeated substituting aminopropyl-methylsiloxane as the reactive pendant groups of the silicone gum.

EXAMPLE XV

In accordance with the general procedure of Example I, Examples I–IX are repeated substituting aminohexyl-methylsiloxane as the reactive pendant groups of the silicone gum.

EXAMPLE XVI

In accordance with the general procedure of Example I, Examples I–IX are repeated employing a silicone gum wherein $R_1$ is methyl, $R_2$ is phenyl and $R_3$ is methyl.

EXAMPLE XVII

In accordance with the general procedure of Example I, the silicone gum of Example I is reacted with p-nitrobenzoyl chloride in the presence of a stoichiometric amount of pyridine.

EXAMPLE XVIII

In accordance with the general procedure of Example I, the silicone gum of Example I is reacted with p-bromobenzoyl chloride in the presence of a stoichiometric amount of pyridine.

EXAMPLE XIX

In accordance with the general procedure of Example I, the silicone of Example XI is reacted with benzylamine.

EXAMPLE XX

In accordance with the general procedure of Example I, the silicone gum of Example I is reacted with p-tolylisocyanate.

EXAMPLE XXI

In accordance with the general procedure of Example I, the silicone of Example XX is reacted with 4-aminobenzene sulfonamide.

EXAMPLE XXII

In accordance with the general procedure of Example I, the silicone gum of Example I is reacted with 2,4-dinitrofluorobenzene.

EXAMPLE XXIII

In accordance with the general procedure of Example I, the silicone gum of Example I is reacted with 1-naphthylisothiocyanate.

EXAMPLE XXIV

In accordance with the procedure of Example I the silicone gum of Example I is reacted with phthalic anhydride.

EXAMPLE XXV

In accordance with the procedure of Example I, the silicone gum of Example I was reacted with the reaction product of nonadecanoic acid and carbonyl-bis-imidazole to provide a soft elastomeric material exhibiting good recovery from deformation.

EXAMPLE XXVI

In accordance with the procedure of Example I the silicone gum of Example I was reacted with octadecyl isocyanate to provide a soft elastomeric material exhibiting good recovery from deformation.

The compounds of the invention are found to have elastomeric properties and can be redissolved in conventional solvents and cast into new shapes.

Having described the present invention with reference to these specific embodiments, it is to be understood that numerous variations can be made without departing from the spirit of the invention and it is intended to include such reasonable variations and equivalents within the scope.

What is claimed is:

1. Novel elastomers of the formula:

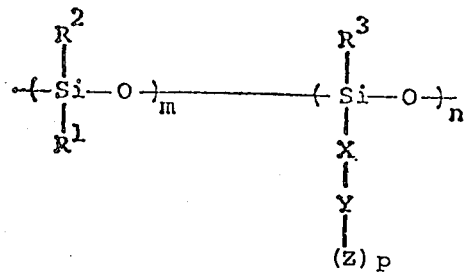

wherein $R^1$, $R^2$ and $R^3$ are independently selected from aryl and alkyl of 1 to 10 carbon atoms; X is a polymethylene chain of from 2 to 10 carbon atoms; Y is a group selected from ureido, silylureido, amido, silylamino, thioureido, silylthioureido, urethano alkylideneamino, isocyanoureido, halosilylamino and sulfonamido; Z is a hydrocarbon of from 1 to 50 carbon atoms selected from alkyl, alkaryl, aryl, aralkyl which hydrocarbon can be substituted with one or more groups selected from hydroxy, nitro, halo, sulfonamido and carboxyl; m and n are integers wherein the ratio of m:n is between 20:1 and 1000:1, and p is an integer of from 1 to 3.

2. An elastomer of claim 1 wherein the ratio of m:n is between 50:1 and 200:1.

3. An elastomer of claim 2 wherein the R groups are methyl.

4. An elastomer of claim 2 of the formula:

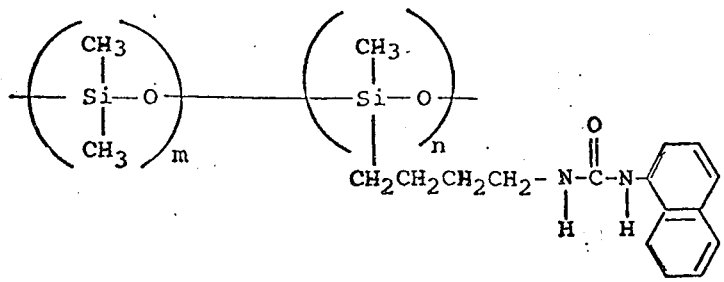

5. An elastomer of claim 2 of the formula:

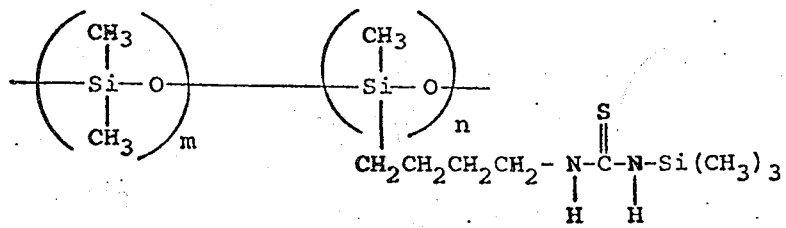

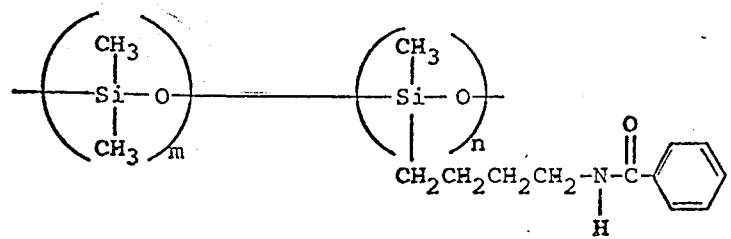
6. An elastomer of claim 2 of the formula:
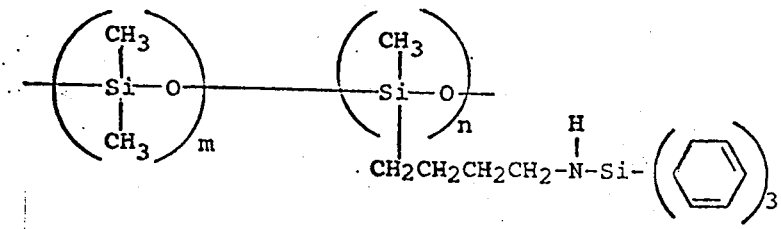
7. An elastomer of claim 2 of the formula:
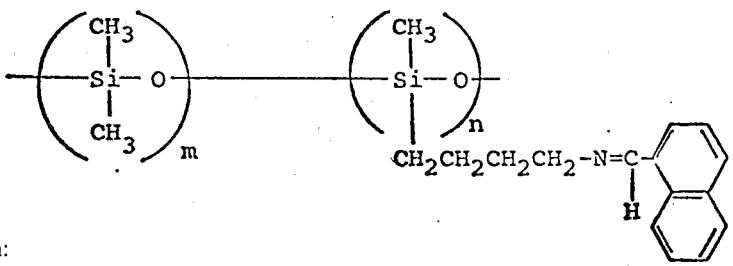
8. An elastomer of claim 2 of the formula:
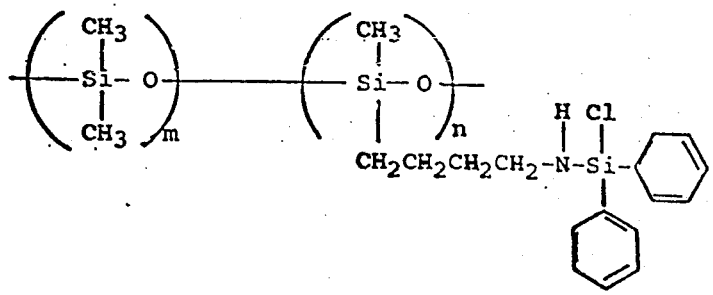
9. An elastomer of claim 2 of the formula:
10. An elastomer of claim 2 of the formula:
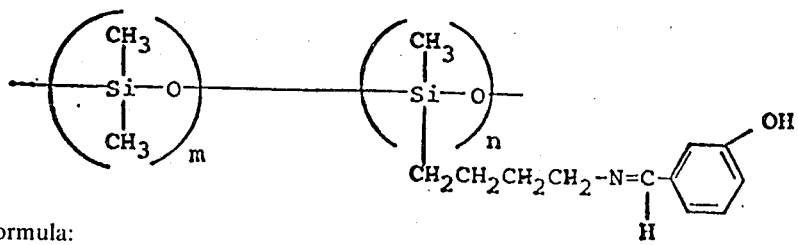
11. An elastomer of claim 2 of the formula:
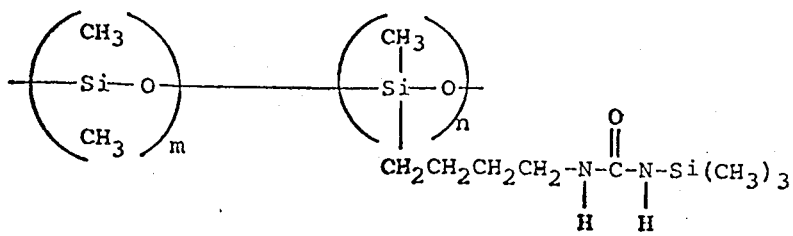

12. An elastomer of claim 2 of the formula:
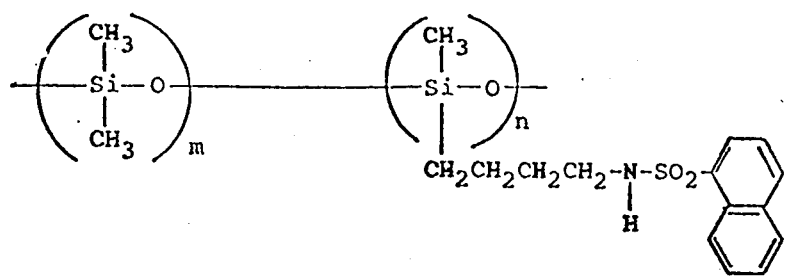
14. An elastomer of claim 2 of the formula:
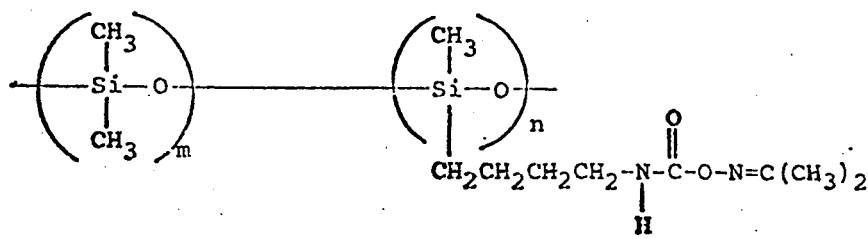
13. An elastomer of claim 2 of the formula:
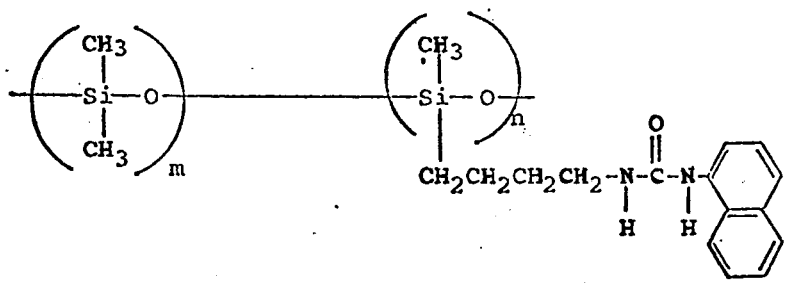
15. An elastomer of claim 2 of the formula:
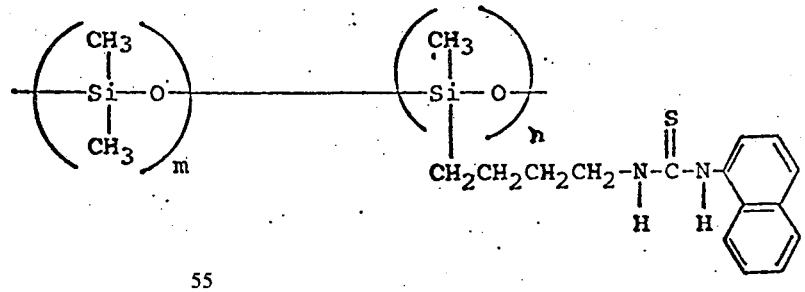
* * * * *